US012127711B2

(12) United States Patent
Allegra et al.

(10) Patent No.: US 12,127,711 B2
(45) Date of Patent: Oct. 29, 2024

(54) PRODUCT DISPENSER AND LIFT UNIT (71) Applicant: Franke Foodservice Systems, Inc., Smyrna, TN (US)

(72) Inventors: Mark Allegra, Brentwood, TN (US); Khalil Chmayssani, Nolensville, TN (US)

(73) Assignee: FRANKE TECHNOLOGY & TRADEMARK LTD., Hergiswil (CH)

( * ) Notice: Subject to any disclaimer, the term of this patent is extended or adjusted under 35 U.S.C. 154(b) by 0 days.

(21) Appl. No.: 16/112,697

(22) Filed: Aug. 25, 2018

(65) Prior Publication Data

US 2019/0090691 A1    Mar. 28, 2019

Related U.S. Application Data (60) Provisional application No. 62/549,988, filed on Aug. 25, 2017.

(51) Int. Cl.
*F25D 13/06* (2006.01)
*A47J 37/12* (2006.01)

(52) U.S. Cl.
CPC .......... *A47J 37/1228* (2013.01); *F25D 13/06* (2013.01)

(58) Field of Classification Search
CPC ... A47J 37/1219; A47J 37/1228; G07F 9/105; G07F 11/44; G07F 17/0085; F35D 13/06
See application file for complete search history.

(56) References Cited

U.S. PATENT DOCUMENTS

| 1,259,035 | A | * | 3/1918 | Miller | B66B 17/26 414/610 |
| 2,789,727 | A | * | 4/1957 | Singleton | F42B 39/02 221/124 |
| 2,807,203 | A | | 9/1957 | Buechele et al. | |

(Continued)

FOREIGN PATENT DOCUMENTS

| EP | 0368699 A2 | 5/1990 |
| EP | 0406475 A1 | 1/1991 |

(Continued)

OTHER PUBLICATIONS

International Search Report and Written Opinion, Franke Foodservice Systems, Inc., PCT/US2018/048035 (International Filing Date Aug. 25, 2018).

(Continued)

*Primary Examiner* — Gene O Crawford
*Assistant Examiner* — Kelvin L Randall, Jr.
(74) *Attorney, Agent, or Firm* — Wayne Edward Ramage; Baker Donelson (57) ABSTRACT

A modified product dispenser unit and a batch product lift or elevator unit adjacent to an automatic fryer. Fries (or other forms of batch product) are dispensed into an angled chute, and thence into the lift or elevator batch product holder at the bottom or loading position in a batch product elevator in the batch product elevator unit. The holder is raised by motorized chains, cables, or the like to a top or release position in the batch product lift or elevator, where the fries are then delivered to an exit chute which drops the fries into the automatic fryer. The batch product lift or elevator unit may comprise a pair of holders and corresponding lifting mechanism and exit chutes, corresponding to the pair of hoppers.

8 Claims, 10 Drawing Sheets

(56) References Cited

U.S. PATENT DOCUMENTS

| | | | |
|---|---|---|---|
| 2,853,937 A * | 9/1958 | Peck | A47J 37/1214 99/404 |
| 3,398,672 A | 8/1968 | Hoeberigs | |
| 3,818,820 A * | 6/1974 | Harris | A47J 37/1228 99/336 |
| 3,935,958 A * | 2/1976 | Frangos | A47L 15/502 206/513 |
| 4,228,730 A | 10/1980 | Schindler et al. | |
| 4,687,119 A * | 8/1987 | Juillet | G07F 9/105 221/101 |
| 4,748,902 A * | 6/1988 | Maurantonio | A47J 37/1228 99/326 |
| 4,964,535 A | 10/1990 | Curwen | |
| 5,142,968 A | 9/1992 | Caron et al. | |
| 5,172,328 A * | 12/1992 | Cahlander | A47J 27/14 700/112 |
| 5,191,918 A | 3/1993 | Cahlander et al. | |
| 5,224,415 A * | 7/1993 | McFadden | A47J 37/1228 221/150 HC |
| 5,249,510 A * | 10/1993 | Rozak | A47J 37/1228 99/336 |
| 5,404,797 A | 4/1995 | Millar | |
| 6,305,573 B1 | 10/2001 | Fritze et al. | |
| RE42,513 E | 7/2011 | Clothier | |
| 8,192,080 B2 | 6/2012 | Clothier | |
| 8,389,910 B2 | 3/2013 | Bourke et al. | |
| 8,770,433 B2 * | 7/2014 | Sus | B65B 43/305 206/564 |
| 8,869,680 B2 * | 10/2014 | Maurer | A47J 37/1228 99/407 |
| 9,605,887 B2 | 3/2017 | Hartig et al. | |
| 10,008,068 B2 * | 6/2018 | Halsey, Jr. | G07F 9/006 |
| 2003/0102303 A1 | 6/2003 | Clothier et al. | |
| 2004/0020555 A1 * | 2/2004 | Sus | A47J 37/1228 141/82 |
| 2004/0099569 A1 * | 5/2004 | Matsutori | H01L 21/67379 206/710 |
| 2005/0051232 A1 | 3/2005 | Schmoll et al. | |
| 2005/0061160 A1 * | 3/2005 | Day | A47J 37/1228 99/404 |
| 2006/0113324 A1 | 6/2006 | Rudesill et al. | |
| 2006/0261080 A1 | 11/2006 | Matsumoto et al. | |
| 2010/0064901 A1 | 3/2010 | Clothier et al. | |
| 2011/0151074 A1 * | 6/2011 | Titen | A23L 5/12 426/233 |
| 2012/0009049 A1 * | 1/2012 | Sekiguchi | C10B 39/02 414/399 |
| 2012/0255967 A1 | 10/2012 | Hecht et al. | |
| 2015/0321825 A1 * | 11/2015 | Schwanitz | G01G 15/00 221/152 |
| 2016/0278577 A1 * | 9/2016 | Kim | A47J 37/1228 |
| 2017/0095118 A1 | 4/2017 | Loss et al. | |
| 2018/0289216 A1 * | 10/2018 | Casey | A47J 37/045 |
| 2020/0058185 A1 * | 2/2020 | Ivosevic | A47J 37/1228 |
| 2020/0305646 A1 * | 10/2020 | Hohler | A23L 5/11 |

FOREIGN PATENT DOCUMENTS

| | | |
|---|---|---|
| EP | 3150092 A1 | 4/2017 |
| WO | WO2008124954 A1 | 10/2008 |
| WO | WO2010049648 A1 | 5/2010 |

OTHER PUBLICATIONS

European Patent Office, Communication Pursuant to Article 94(3) EPC, EP App. No. 18847525.5, dated Mar. 21, 2024 (co-pending application).

Chinese Patent Office, Decision of Rejection, CN 201880068873.2, dated Jun. 29, 2022(co-pending application; rejection based on US 2010/0092626 A1 [Mauer, Ulrich; US counterpart U.S. Pat. No. 8,869,680] and CN 105084026A [Schwanitz, Florian; US counterpart pub. No. US2015/0321825]; both counterpart references already of record in the present application).

* cited by examiner

PRIOR ART

PRODUCT DISPENSER AND LIFT UNIT

This application claims benefit of and priority to U.S. Provisional Application No. 62/549,988, filed Aug. 25, 2017. The specification, drawings and complete disclosure of U.S. Provisional Application No. 62/549,988 are incorporated herein in their entireties by specific reference for all purposes.

FIELD OF INVENTION

This invention relates to an apparatus and method for dispensing of items or products. More particularly, this invention relates to an apparatus and method for automatically dispensing pre-determined portions of bulk food items, such as frozen food items, directly into an automatic fryer.

BACKGROUND OF THE INVENTION

In restaurants, especially quick service (fast food and fast casual) restaurants, fast, consistent, efficient and safe food preparation is essential for a successful operation. One important task frequently required in the preparation of fast food is the portioning of bulk food items supplied in bulk food containers. Bulk food items are typically supplied in containers weighing several pounds or more. Each container holds a large number of individual food items such as french fries, cheese sticks, chicken nuggets or the like. The use of bulk containers is efficient because it minimizes the number of individual containers which must be transported to, handled and stored at a restaurant. Because it is typically unnecessary, undesirable or impossible to prepare the entire contents of a given container at one time, the bulk food items must be portioned before cooking, heating or serving.

Portioning a bulk food product involves many of the efficiency, speed, safety and consistency considerations involved in fast food preparation generally. For example, consistent food preparation requires that portions be of a uniform size because over- or under-sized portions may yield an under- or over-prepared food product when the portion is cooked, heated or otherwise processed. Additionally, portioning should be performed quickly to minimize food preparation delays which may dissatisfy customers. Furthermore, portioning operations should be non-labor intensive so as to efficiently utilize restaurant labor, particularly when such workers are in high demand and difficult to procure. Finally, portioning operations should minimize the manual manipulation of food products by restaurant workers, thereby minimizing safety concerns related to food handling generally.

Although quick service restaurants have existed for many years and now number in the tens of thousands, these establishments typically continue to utilize labor intensive, manual processes to portion the contents of containerized bulk food products. While portioning devices and systems are known in the prior art, these devices and systems still require substantial handling or other manual processes to dispense and deliver the apportioned food products to the cooking machinery. An example of a prior art apparatus is disclosed in Rudesill, et al., "Multi-Product Dispenser and Method of Using Same," U.S. patent application Ser. No. 11/288,478, filed Nov. 29, 2015, which is incorporated herein by specific reference in its entirety for all purposes.

Accordingly, what is needed is a commercially suitable portioning and delivery apparatus for containerized bulk food items that minimizes manual food handling, requires little operator attention, and quickly, automatically, consistently, and accurately portions bulk food items and delivers said portions to the cooking machinery, such as an automatic batch fryer, while maximizing quality, efficiency, flexibility and yield of the bulk food items, for serving or further preparation.

SUMMARY OF THE INVENTION

In various exemplary embodiments, the present invention comprises a modified product dispenser unit and a batch product vertical lift (or elevator) unit adjacent to an automatic fryer. Fries (or other forms of batch product) are dispensed into an angled chute, and thence into the lift or elevator batch product holder at the bottom or loading position in a batch product lift or elevator in the batch product lift or elevator unit. The holder is raised by motorized chains, cables, or the like to a top position in the batch product lift or elevator, where the fries are then delivered to an exit chute which drops the fries into the automatic fryer. The batch product lift or elevator unit may comprise a pair of holders and corresponding lifting mechanism and exit chutes, corresponding to the pair of hoppers, although, in alternative embodiments, the number of hoppers and lifts or elevators may vary, and, in some embodiments, multiple hoppers may feed a single lift or elevator.

DETAILED DESCRIPTION OF EXEMPLARY EMBODIMENTS

In the following description and accompanying drawings, like reference numbers, as used in the various figures, refer to like features or elements. For purposes of the description hereinafter, the terms "upper," "lower," "right," "left," "vertical," "horizontal," "top," "bottom," and derivatives thereof shall relate to the invention, as it is oriented in the drawing figures. However, it is to be understood that the invention may assume various alternative variations and step sequences that the specific devices and process illustrated in the attached drawings and described in the following text are simply exemplary embodiments of the invention. Hence, specific dimensions and other physical characteristics related to the embodiments disclosed hereinafter are not to be considered limiting.

While embodiments are discussed herein in terms of dispensing french fries, the product may be any dispensable item, including for example, frozen food such as patties or nuggets or a vegetable food item other than french fries, any of which might require portioning to a predetermined weight and dispensing them on demand into a receptacle prior to cooking, heating or other processing.

Figure 1:
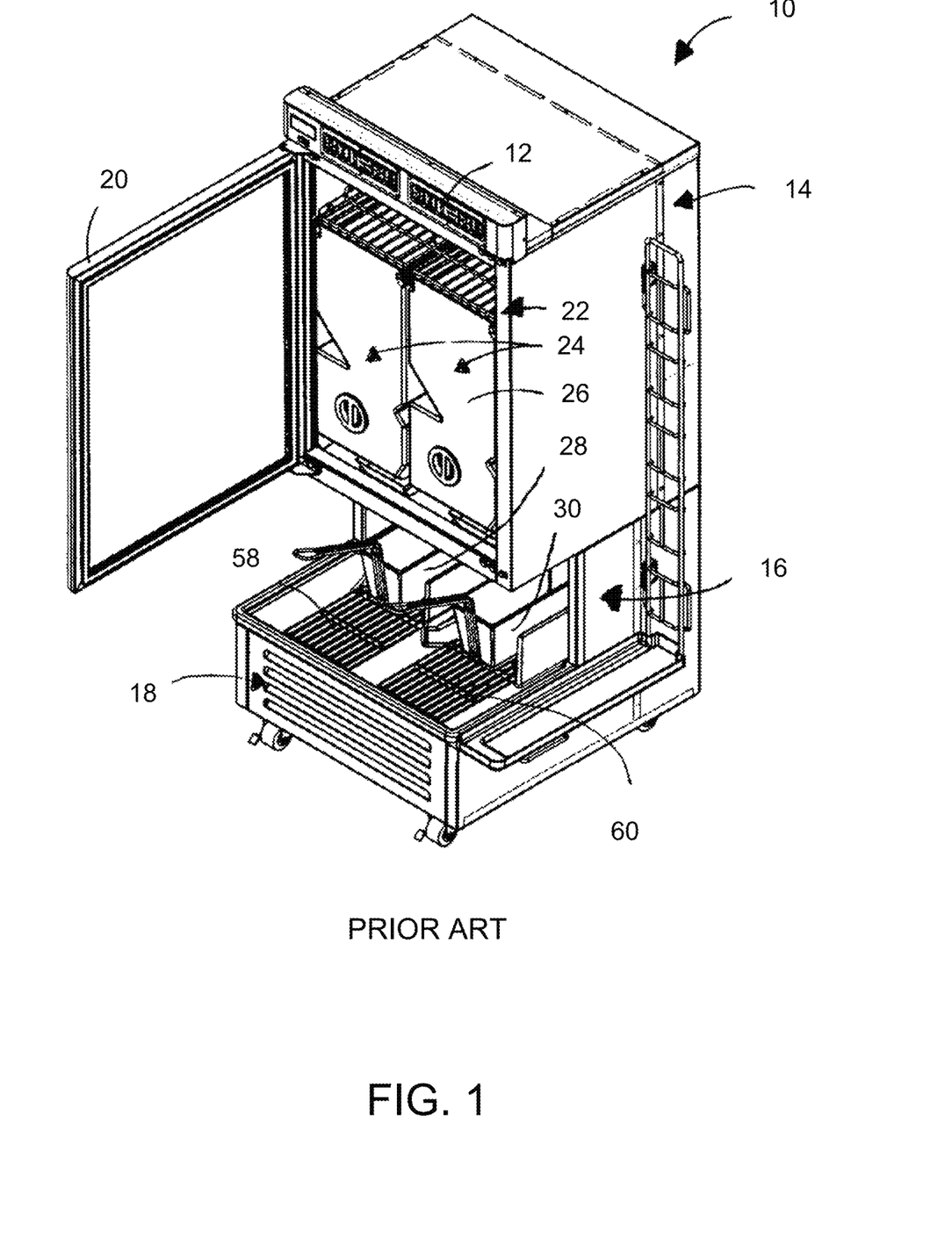
FIG. 1 shows a view of a prior art dispenser system.

FIG. 1 shows an example of a prior art dispensing apparatus, as disclosed in Rudesill, U.S. patent application Ser. No. 11/288,478. The dispenser unit 10 includes a control panel 12, a cabinet 14, a dispense assembly 16 and a self-contained refrigerator system 18. Cabinet 14 having cabinet door 20 provides access to a drum/hopper storage area 22. Hopper storage area 22 supports a first hopper 24 and an optional second hopper 26. Hoppers 24 and 26 are located adjacent to each other. Hopper storage area 22 may also support an additional number of hoppers. Hoppers 24 and 26 are designed to receive a plurality or bulk amount of frozen food, such as french fries. The french fries in hoppers 24 and 26 are portioned to a predetermined weight (typically through some form of gating mechanism, such as a rotating metering drum) and dispensed into one or more fry receiving baskets 28 and 30, respectively. Proximity sensors detected the presence of the fry receiving baskets, which are manually placed in the respective dispense lane guides 58, 60, causing dispensing doors to open and drop fries into the basket. Fry baskets are then manually removed and lowered into a fry vat for cooking.

Figure 2:
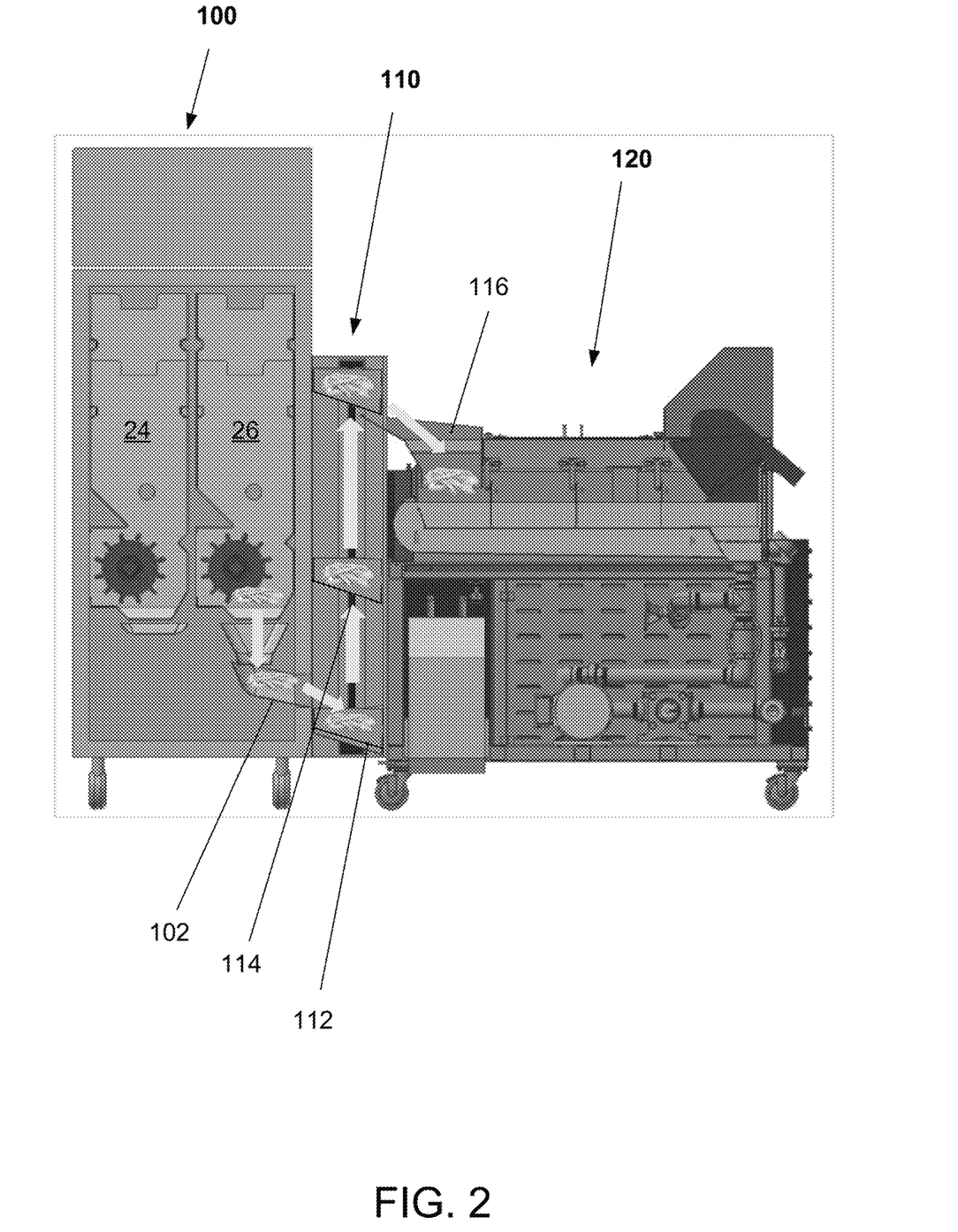
FIG. 2 shows a side cutaway view of a modified dispenser unit and a batch product elevator unit adjacent to an automatic fryer.
Figure 3:
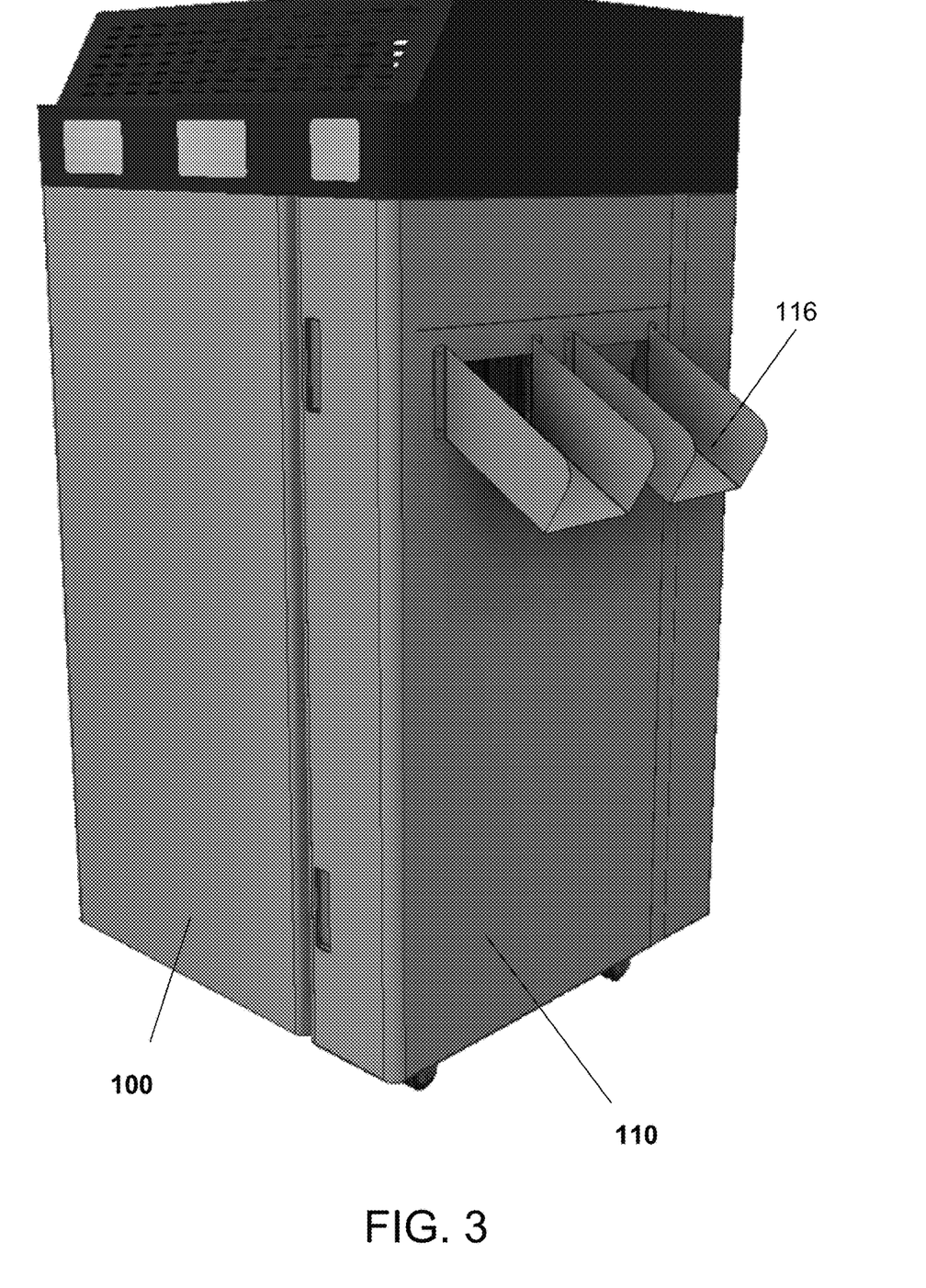
FIGS. 3-7 show views of another embodiment of a modified dispenser unit with a batch product elevator unit.
Figure 4:
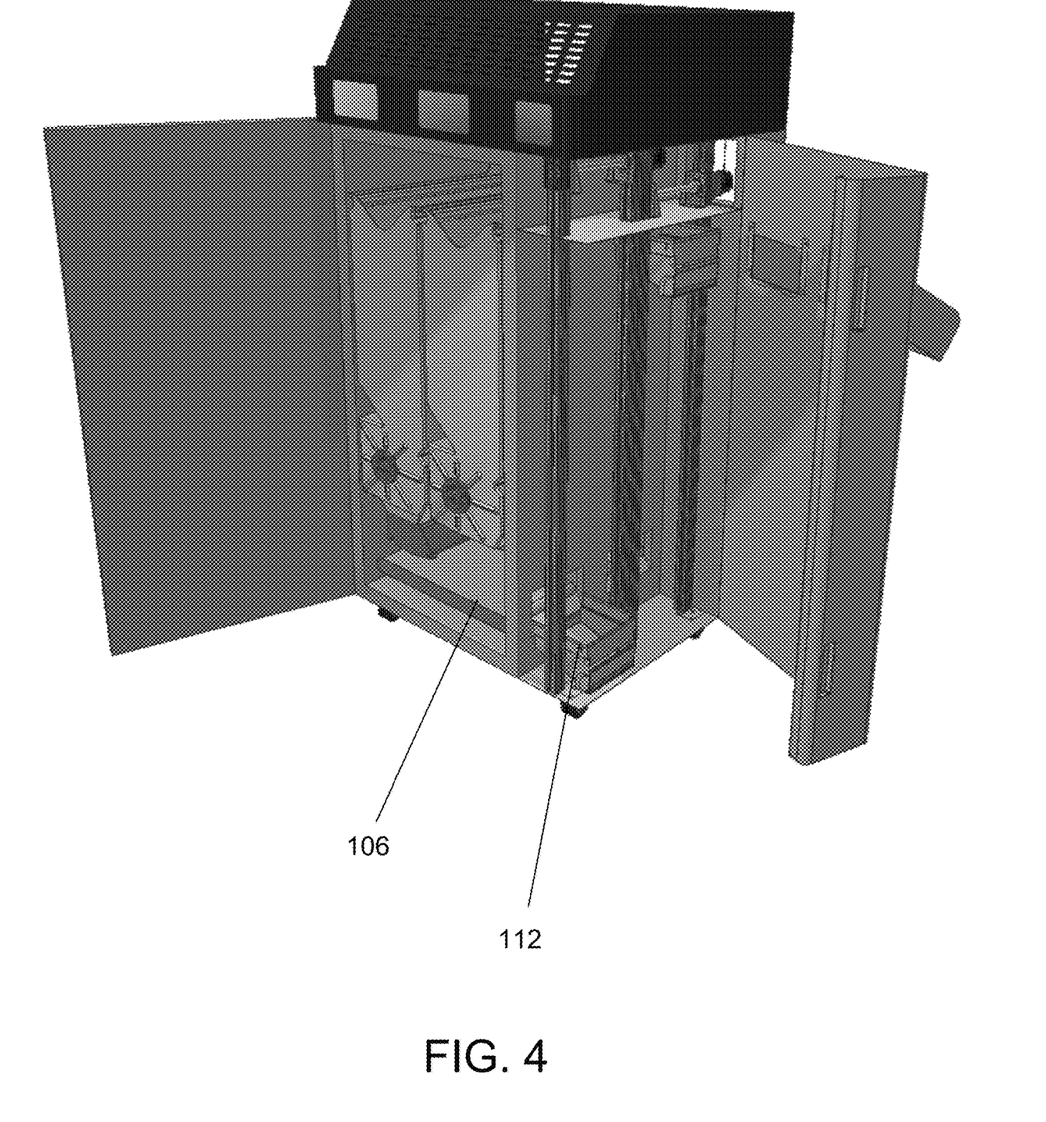
Figure 5:
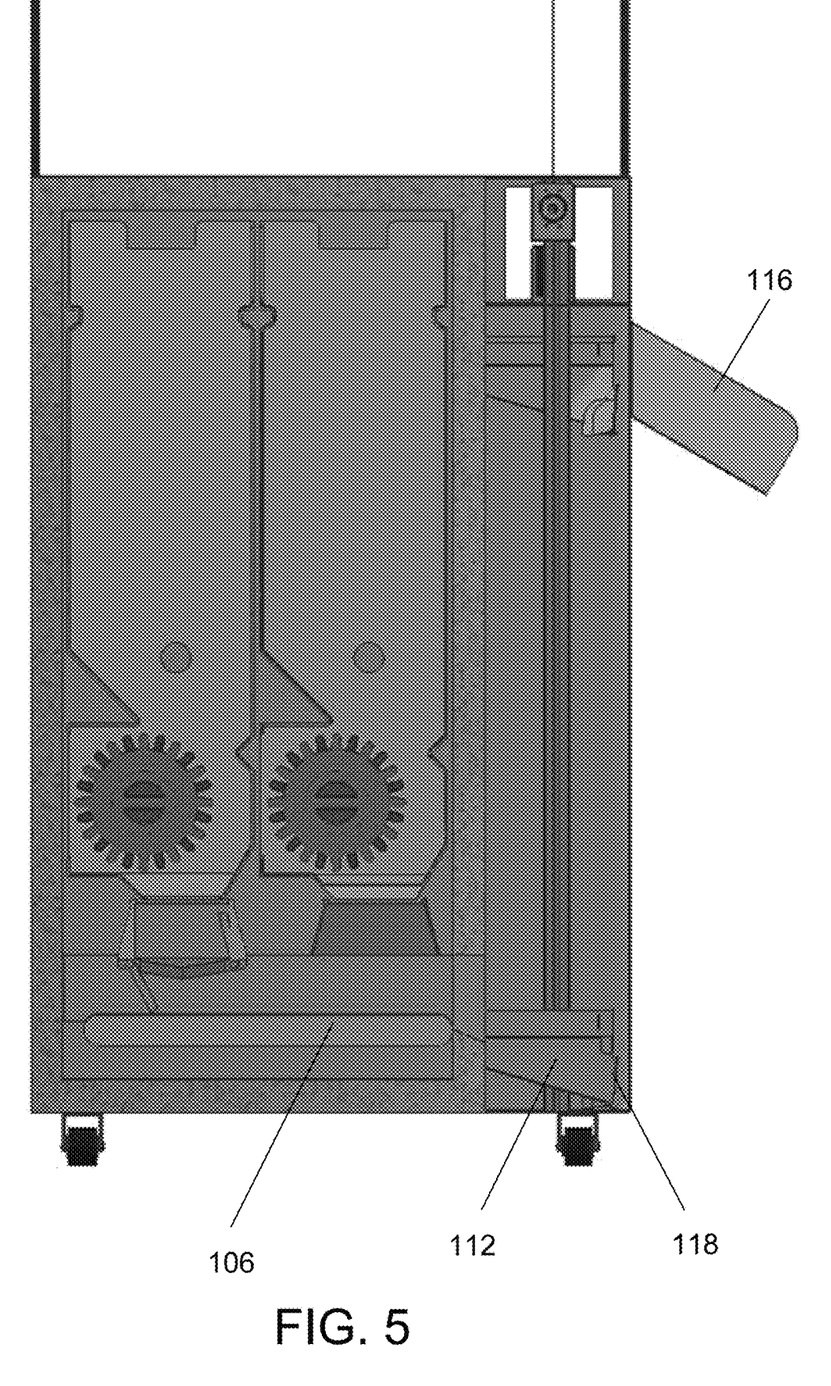
Figure 6:
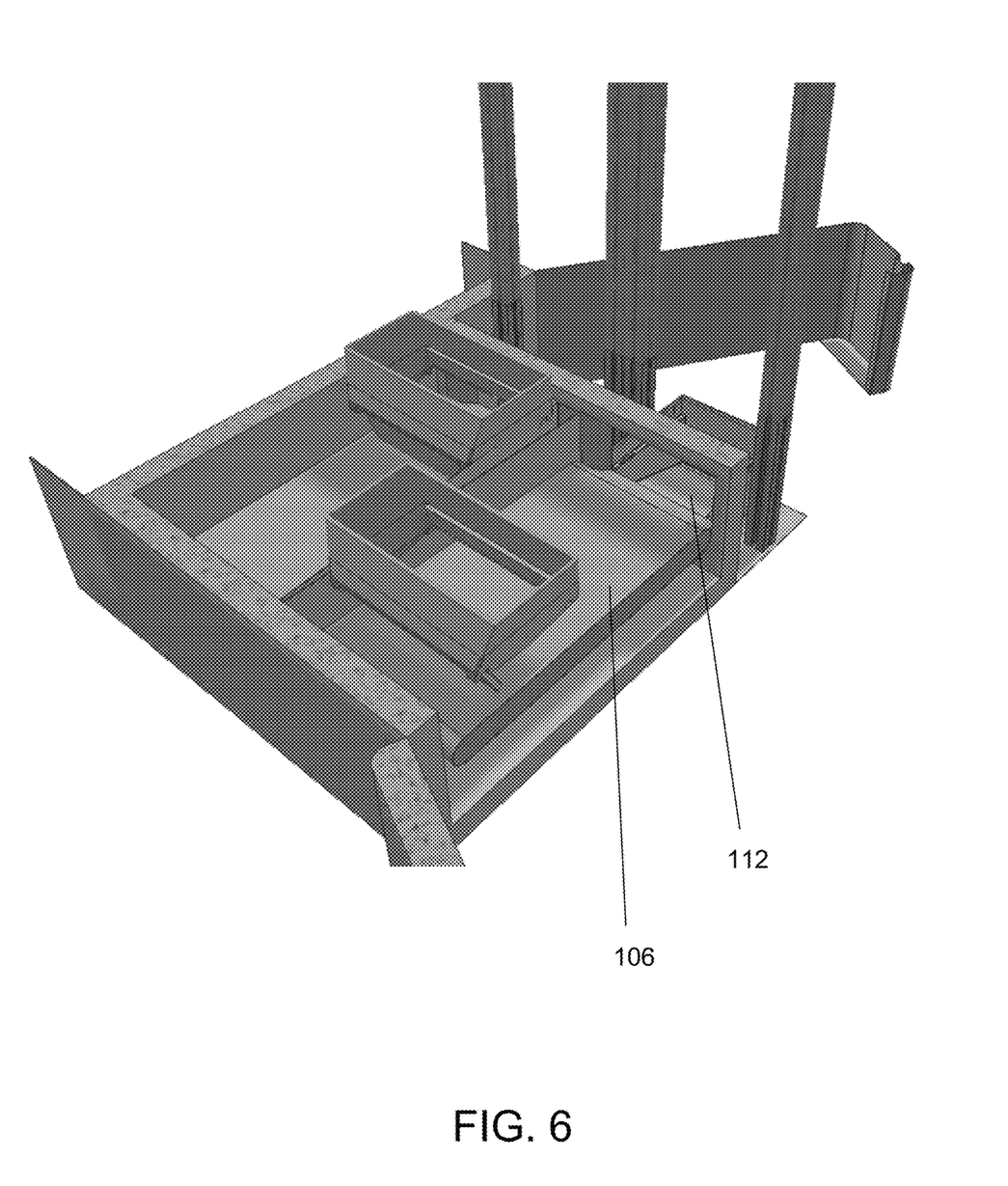
Figure 7:
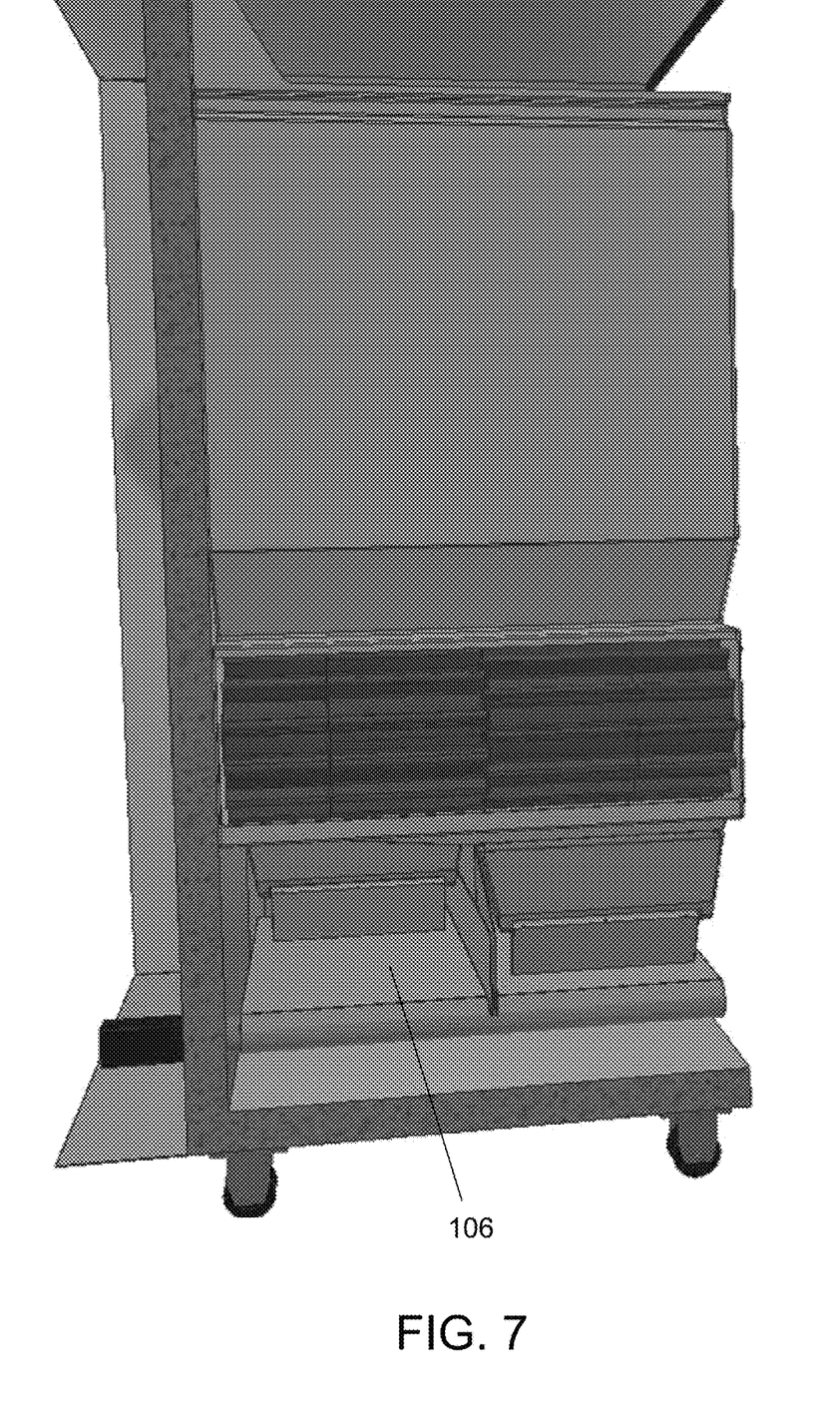

FIG. 2 shows a modified dispenser unit 100 and a batch product vertical lift (or elevator) unit 110 adjacent to an automatic fryer 120, in accordance with an exemplary embodiment of the present invention. Fries are dispensed into an angled chute 102, and thence into the lift or elevator batch product holder (e.g., "elevator car") 112 at the bottom or loading or receiving position in a batch product lift or elevator in the batch product lift or elevator unit 110. The holder is raised by motorized chains, cables, or the like 114 to a top or release or upper position in the batch product lift or elevator, where the fries are then delivered to an exit chute 116 which drops the fries into the automatic fryer 120. The release position may be directly vertically above the loading position, or may be laterally/horizontally displaced to some extent (i.e., the lift is at an angle). The batch product lift or elevator unit may comprise a pair of holders and corresponding lifting mechanism and exit chutes, corresponding to the pair of hoppers 24, 26, although, in alternative embodiments, the number of hoppers and lifts/elevators may vary, and, in some embodiments, multiple hoppers may feed a single lift or elevator.

FIGS. 3-7 show an alternative embodiment of the present invention where fries are dispensed onto a conveyor belt 106, which transports the fries to the corresponding holder 112. Each hopper dispenses fries onto a separate conveyor belt, and feeds a separate holder. The dispensing doors of the dispensing units may be offset.

In the embodiment shown, the holders 112 are attached to the corresponding lifting mechanism on each side. The left (or receiving) side or end (when viewed from the orientation shown in FIG. 5) of the holder is open to receive fries from the dispenser unit. The bottom is sloped to the right (or release) side or end, causing the fries to aggregate near the right/release end. When the holder is filled, the left or receiving end may remain open, or may be closed (such as by a flap or gate). The right side or end comprises a flap or gate 118 that is closed to hold the fries in the holder during loading and lifting, but opens when the holder reaches the top or upper release position of the respective lift or elevator, releasing fries to the exit chute 116. The holder may be fixedly attached to the lift mechanism (so that the slope of the bottom of the holder and the exit chute cause the fries to move from the holder), although in alternative embodiments other release mechanisms may be used. For example, the holder may be pivotably or rotatably attached to the lift mechanism, so that the holder may rotate or pivot with respect to the lift mechanism at the release position, thereby assisting the fries to be released to the exit chute. This may be used in conjunction with the flap or gate 118, although in some embodiments, the rotation or pivoting motion may be substantial enough to allow fries to be released through the top of holder. In several of these embodiments, the holder may have a flat or flatter bottom that is not sloped as described above.

Figure 8:
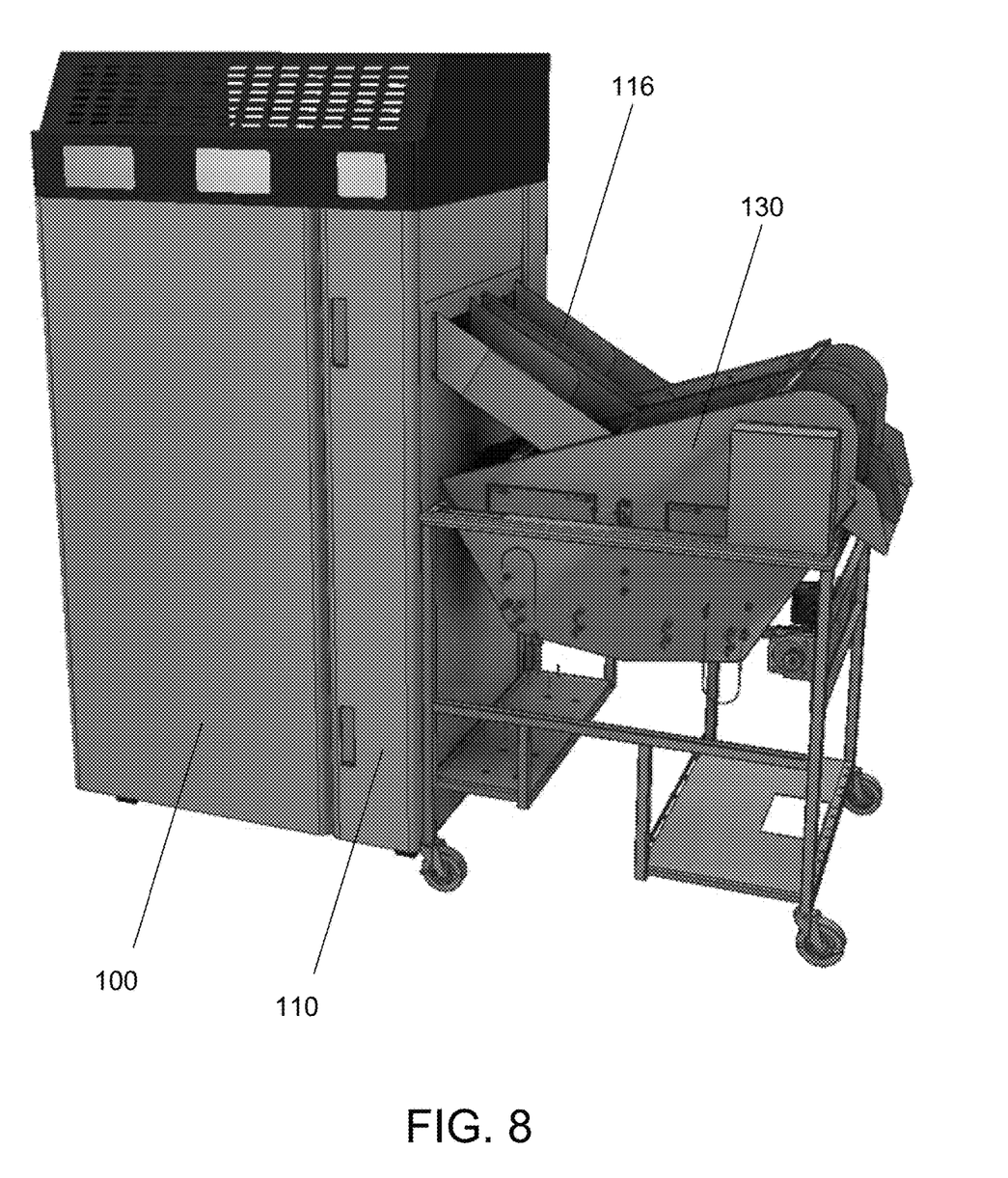
FIGS. 8-9 show views of a modified dispenser unit with a batch product elevator unit in use with an adjunct conveying unit.
Figure 9:
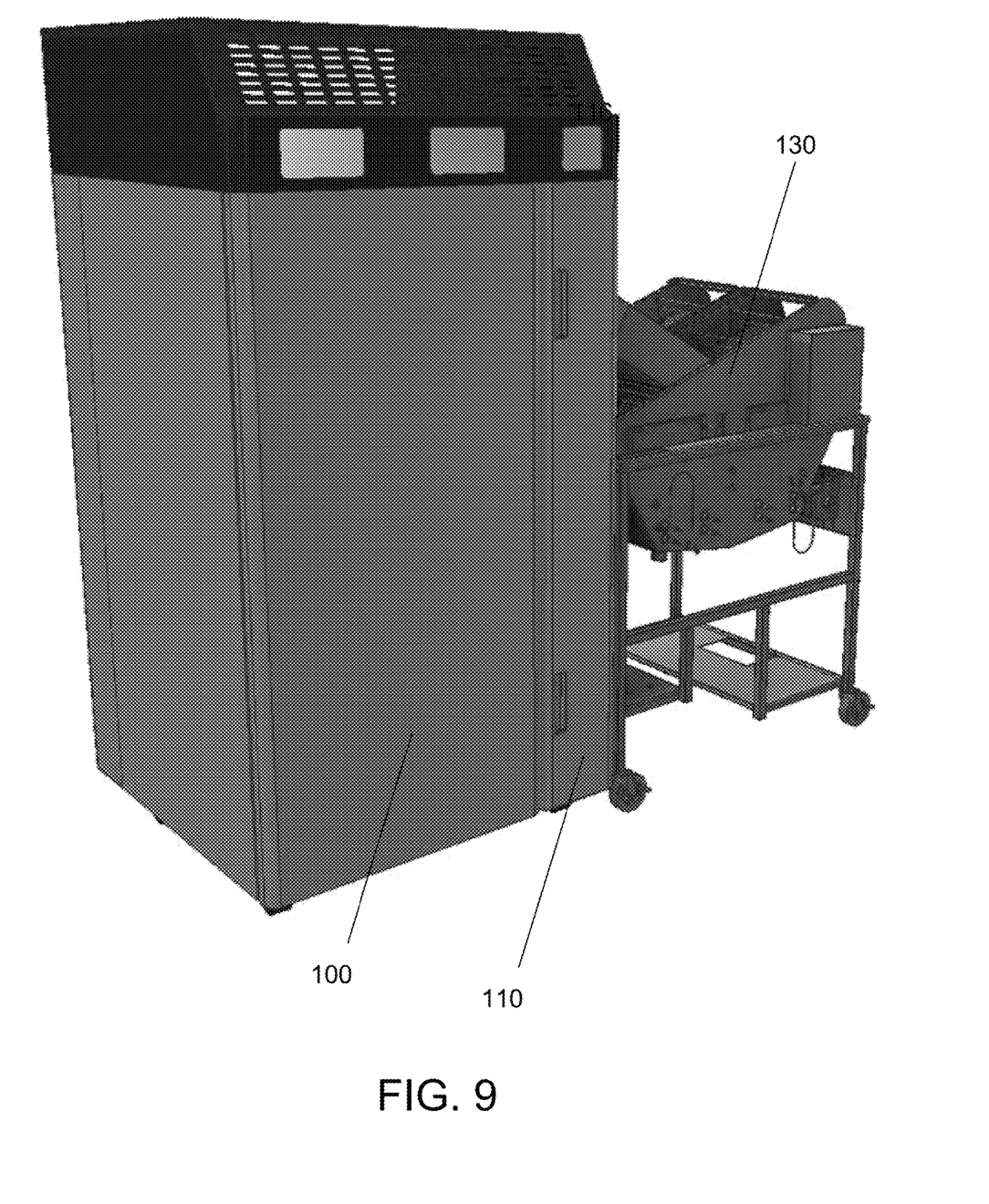
Figure 10:
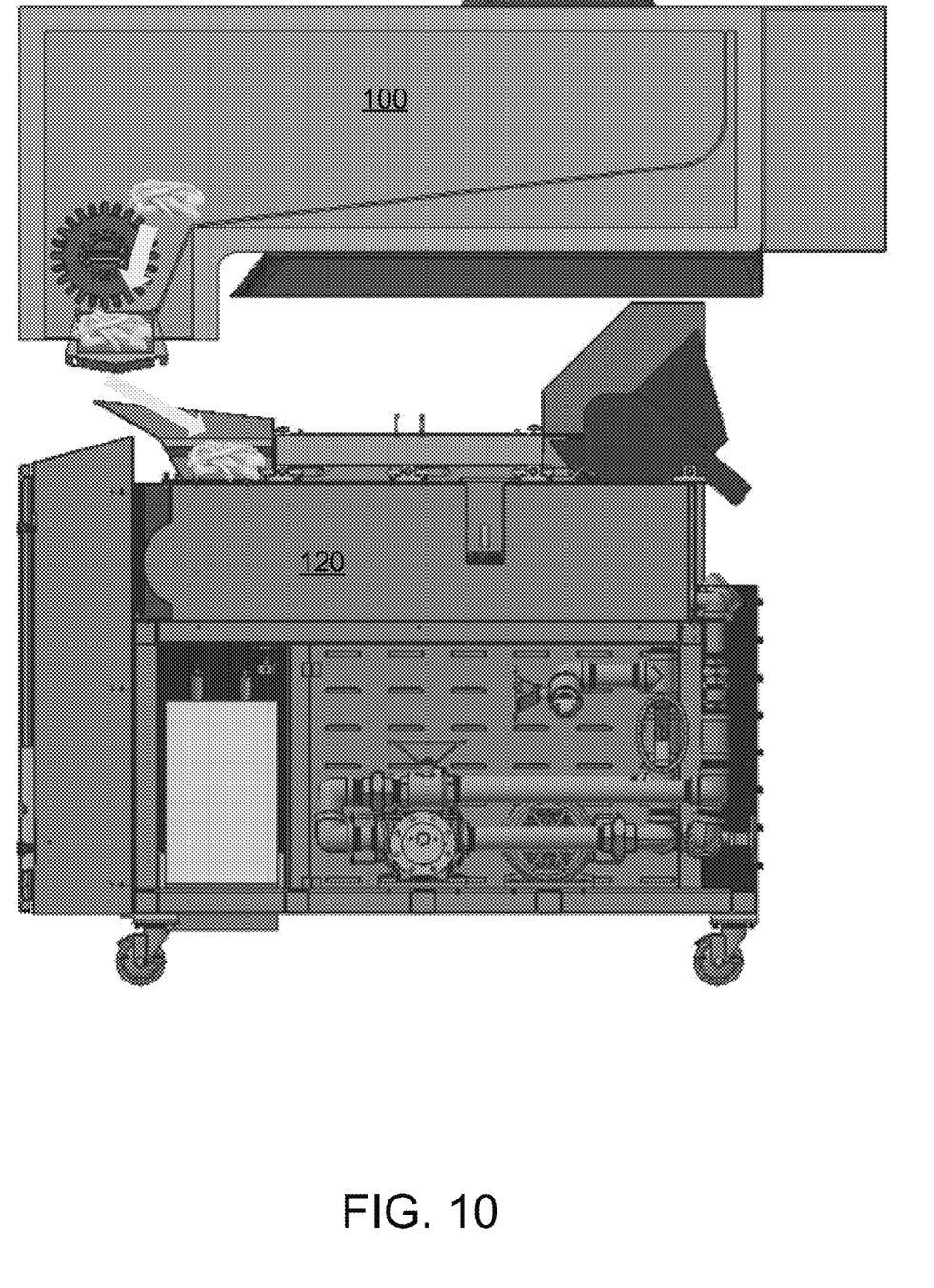
FIG. 10 shows a view of another embodiment of a modified dispenser unit positioned above an automatic fryer.

While the exit chutes can deliver fries directly into a fryer, as seen in FIG. 2, FIGS. 8-9 show the elevator unit delivering fries to an adjunct conveying unit 130. Each conveyor (where there are multiple conveyor lines) in the adjunct conveying unit delivers the fries to a frying unit. The adjunct conveying unit may be on a wheeled frame or cart, and may be adjusted in height or length, thus allowing the dispenser and lift/elevator unit to be positioned at a distance from the frying unit, or to accommodate a different in height between the exit chutes and the frying unit. In yet another exemplary embodiment, as seen in FIG. 10, the dispensing unit can be positioned above the fryer.

The modified dispenser unit and batch product lift or elevator unit can be separate, or integrated into a single structure. As seen in the figures, the dispenser and lift/elevator units may each have separate doors or access points. The present invention is advantageous and may be utilized in any commercial or institutional food service facility such as restaurants, universities, hospitals, catering/banquet/convention halls, and the like. Additionally, the invention provides advantages of automatically portioning a predetermined amount of bulk food efficiently in a time effective manner, and automatic delivery to an automatic frying unit. In particular, the present invention improves the quality and yield of the bulk food item, increases speed, as well as allows for flexibility in the design of the dispenser unit. Additionally, the simple, one-handed operation, and ergonomic controls, as well as the removable parts, provide other advantages. These and other advantages will be recognized by the user.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A bulk product dispensing apparatus, comprising:
   a cabinet housing with an interior and at least one exterior surface;
   a refrigerated hopper storage area disposed in the interior of the cabinet housing, with a first hopper therein, said first hopper configured to store a plurality of a bulk product;
   a rotating metering drum disposed in the interior of the cabinet housing below the first hopper, said rotating metering drum configured to receive a first portion of the plurality of the bulk product dropped from the first hopper;
   a first conveying means disposed in the interior of the cabinet housing below the rotating metering drum, said first conveying means configured to receive a second portion of the plurality of the bulk product from the rotating metering drum;
   a batch product vertical lift unit disposed on or attached to said at least one exterior surface of the cabinet housing, said batch product vertical lift unit comprising a first bulk product holder comprising a fixed bottom, an open top, a receiving end, and a release end adjacent to the fixed bottom, wherein the receiving end or the open top is configured to receive the second portion from the first conveying means, the release end is positioned further from the interior of the cabinet housing, and the bottom slopes downward from the receiving end to the release end; and a first vertical lift elevator, configured to move the first holder vertically and linearly upward from a loading position to a release position, wherein the release position is at a higher elevation than the loading position and directly above the loading position;

wherein the first holder is adapted to receive bulk product through the receiving end or open top in the loading position, move vertically upwards in its entirety to the release position, and automatically release said bulk product through the release end to a first exit chute in a direction away from the interior of the cabinet housing without movement of the fixed bottom when in the release position, wherein the release end is not the same as the receiving end or the open top; and further wherein the release end comprises a flap or gate, where said flap or gate is in a closed position when the first holder is in the loading position, is in a closed position when the first holder is moving between the loading position and the release position, and is in an open position when the holder is in the release position.

2. The apparatus of claim 1, wherein the first holder is fixedly attached to the first vertical lift.

3. The apparatus of claim 1, where the first holder is pivotally or rotatably attached to the first vertical lift.

4. The apparatus of claim 1, wherein the first exit chute is configured to deliver the bulk product directly into an automatic fryer.

5. The apparatus of claim 1, wherein the refrigerated hopper storage area comprises a freezer box with a self-contained refrigeration unit.

6. The apparatus of claim 1, said conveying means comprising a first conveyor belt configured to receive said second portion from the rotating metering drum and to deliver said second portion to the first holder.

7. The apparatus of claim 1, wherein the bulk product comprises bulk frozen food.

8. The apparatus of claim 1, where the bulk product comprises french fries.

\* \* \* \* \*